(12) United States Patent
Dunjic et al.

(10) Patent No.: US 10,956,905 B2
(45) Date of Patent: Mar. 23, 2021

(54) SYSTEM AND METHOD OF SESSION KEY GENERATION AND EXCHANGE

(71) Applicant: The Toronto-Dominion Bank, Toronto (CA)

(72) Inventors: Milos Dunjic, Oakville (CA); Perry Aaron Jones Haldenby, Toronto (CA); Arthur Carroll Chow, Markham (CA); Anthony Haituyen Nguyen, Toronto (CA); Het Anand Patel, Mississauga (CA); Casey Lyn Doyle, Ajax (CA); Yubing Liu, Toronto (CA); John Jong-Suk Lee, Toronto (CA); David Samuel Tax, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 631 days.

(21) Appl. No.: 15/725,689

(22) Filed: Oct. 5, 2017

(65) Prior Publication Data
US 2019/0108511 A1    Apr. 11, 2019

(51) Int. Cl.
*G06Q 20/38* (2012.01)
*G06Q 20/36* (2012.01)
(Continued)

(52) U.S. Cl.
CPC ....... *G06Q 20/3829* (2013.01); *G06Q 20/322* (2013.01); *G06Q 20/367* (2013.01);
(Continued)

(58) Field of Classification Search
CPC ........... G06Q 20/3829; G06Q 20/3674; G06Q 20/367; G06Q 20/211; G06Q 20/385;
(Continued)

(56) References Cited

U.S. PATENT DOCUMENTS

2005/0287987 A1* 12/2005 Yamamoto ....... G11B 20/00492
                                                                   455/410
2010/0257612 A1* 10/2010 McGuire .............. G06Q 20/383
                                                                   726/26
(Continued)

FOREIGN PATENT DOCUMENTS

EP    3040922 A1    7/2016
IN    2711DEL2015 A    9/2015
(Continued)

OTHER PUBLICATIONS

Jaywalker, What is ARQC?, https://chipnpin.blogspot.com/2012/01/what-is-arqc.html, Jan. 15, 2012.*
(Continued)

*Primary Examiner* — Steven S Kim
(74) *Attorney, Agent, or Firm* — Rowand LLP

(57) ABSTRACT

Computer-implemented methods and systems reliant on establishing a common session key between an electronic device and a computer server are disclosed. The method and systems may be for processing de-tokenization requests in payment transaction processing and for preparing an electronic device to perform payment transactions. During such a transaction, the server may perform a method that includes receiving a de-tokenization request including a payment token and a cryptogram generated by the electronic device using a session key generated by the electronic device based on a fingerprint of the electronic device, a secret value previously shared with the electronic device, the payment token, and a transaction counter; retrieving the fingerprint, the secret value, and the transaction counter and generating the session key based on the same; verifying the cryptogram using the session key; retrieving an associated account number; and sending response to the request including the account number.

13 Claims, 10 Drawing Sheets

(51) Int. Cl.
*G06Q 20/32* (2012.01)
*H04L 9/08* (2006.01)
*H04L 9/32* (2006.01)

(52) U.S. Cl.
CPC ....... *G06Q 20/3674* (2013.01); *G06Q 20/385* (2013.01); *H04L 9/0866* (2013.01); *H04L 9/3226* (2013.01); *H04L 9/3234* (2013.01); *H04L 2209/56* (2013.01); *H04L 2209/805* (2013.01)

(58) Field of Classification Search
CPC ... H04L 9/0866; H04L 9/3234; H04L 9/3226; H04L 2209/56; H04L 2209/805
See application file for complete search history.

(56) References Cited

U.S. PATENT DOCUMENTS

| | | | |
|---|---|---|---|
| 2011/0138185 A1* | 6/2011 | Ju | H04L 9/3271 713/171 |
| 2013/0254102 A1* | 9/2013 | Royyuru | G06Q 20/382 705/39 |
| 2014/0337236 A1* | 11/2014 | Wong | G06Q 20/38215 705/71 |
| 2015/0019442 A1* | 1/2015 | Hird | H04W 12/04031 705/71 |
| 2015/0073995 A1* | 3/2015 | Hayhow | G06Q 20/3821 705/71 |
| 2015/0220917 A1 | 8/2015 | Wilson | |
| 2015/0262180 A1* | 9/2015 | Hambleton | G06Q 40/02 705/71 |
| 2015/0312246 A1* | 10/2015 | Mattsson | G06F 16/84 726/26 |
| 2015/0319158 A1* | 11/2015 | Kumnick | H04L 63/083 726/9 |
| 2015/0339664 A1 | 11/2015 | Flurscheim | |
| 2016/0012432 A1* | 1/2016 | Meshkati | G06Q 20/322 705/44 |
| 2016/0028550 A1* | 1/2016 | Gaddam | H04L 9/3215 713/173 |
| 2016/0065370 A1* | 3/2016 | Le Saint | H04L 9/14 713/155 |
| 2016/0132881 A1 | 5/2016 | Lee et al. | |
| 2016/0140545 A1 | 5/2016 | Flurscheim et al. | |
| 2016/0217467 A1 | 7/2016 | Smets et al. | |
| 2017/0032369 A1 | 2/2017 | Hugot | |
| 2017/0046690 A1 | 2/2017 | Tierney et al. | |
| 2017/0061419 A1 | 3/2017 | Kim et al. | |
| 2017/0068953 A1 | 3/2017 | Kim et al. | |
| 2017/0083882 A1 | 3/2017 | Kim et al. | |
| 2017/0091752 A1 | 3/2017 | du Chene et al. | |
| 2017/0272253 A1* | 9/2017 | Lavender | H04L 9/14 |
| 2018/0204212 A1* | 7/2018 | Collinge | H04W 12/0401 |

FOREIGN PATENT DOCUMENTS

| | | |
|---|---|---|
| WO | 2015121307 A1 | 8/2015 |
| WO | 2016079403 A1 | 5/2016 |
| WO | 2016193227 A1 | 12/2016 |

OTHER PUBLICATIONS

"EMV Integrated Circuit Card Specifications for Payment Systems: Book2 Security and Key Management" version 4.3, Nov. 2011.*
Konstantin Rubinuv, Lucia Rusgulete, Iulika Mitra, Abhik Roychoudhury, "Automated Partitioning of Android Applications for Trusted Execution Environments", Apr. 3, 2009, Published in: Software Engineering (ICSE), 2016 IEEE/ACM 38th International Conference, Date of Conference: May 14-22, 2016, Date Added to IEEE Xplore: Apr. 3, 2017, Electronic ISSN: 1558-1225, INSPEC Accession No. 16790468, DOI: 10.1145/2884781.2884-817 Publisher: IEEE, Conference Location: Austin, TS, USA.
Chrstof Arnosti, Dominik Gruntz, Marco Hauri, "Secure Physical Access with NFC-enabled Smartphones", Published in: Big Data Security on Cloud (BigDataSecurity), IEEE International Conference on High Performance and Smart Computing (HPSC), and IEEE International Conference on Intelligent Data and Security (IDS), 2016 IEEE 2nd International Conference on Date of Conference: Apr. 9-10, 2016, Date Added to IEEE Xplore: Jul. 4, 2016, Electronic ISBN: 978-1-5090-2403-2, INSPEC Accession No. 16123656, DOI: 10.1109/BigDataSecurity HPSC-IDC.2016-48, Puglisher: IEEE, Conference Location: New York,NY, USA.
Urien, Pascal, Aghina, Xavier, "Secure Mobile Payments Based on Cloud Services: Concepts and Experiments", 2016 IEEE 2nd International Conference on Big Data Security on Cloud, IEEE International Conference on High Performance and Smart Computing, IEEE International Conference on Intelligent Data and Security, pp. 333-338, IEEE Computer Society, France.
EMV Book 2—Security and Key Management (version 4.3, Nov. 2011, available from EMVCo (TM)).
Specification Bulletin No. 167 (Jan. 2016) by EMVCo.
Emv(R) Payment Tokenisation Specification—Technical Framework, (v2.0, Sep. 2017), available from EMVCo.
EMV 4.1, Book 2 Session and Key Management, (May 2004), Part II, A1.3.
Section 5.2 of the EMV Card Personalization Specification (Jun. 2003) by EMVCo.
H. Krawczyk et al., "HMAC: Keyed-Hashing for Message Authentication" (Feb. 1997), https://tools.ietf.org/html/rfc2104.
B. Kaliski, "PKCS #5: Password-Based Cryptography Specification Version 2.0" (Sep. 2000), https://tools.ietf.org/html/rfc2898
EMV Specification Version 4.3 Book 3—Application Specification (Nov. 28, 2011).
Specification and Drawings of 2711/DEU2015 as retrieved Jan. 10, 2018 from InPass (Indian Patent Office Online dossier access system).

* cited by examiner

SYSTEM AND METHOD OF SESSION KEY GENERATION AND EXCHANGE

TECHNICAL FIELD

The present application relates to cryptography, and more particularly to the generation and exchange of session keys.

BACKGROUND

Session keys are symmetric keys used for encrypting messages in a single communication session.

Sessions keys are employed in the application of cryptographic techniques in many application domains. For example, session keys are utilized in EMV™ payment transactions to secure communications such as, for example, in calculating the EMV transaction cryptogram. The use of session keys in EMV payment transactions is set out in EMV Book 2—Security and Key Management (version 4.3, November 2011, available from EMVCo™), the contents of each of which are incorporated herein by reference in their entirety.

Some electronic devices may use a so-called secure element (SE) to emulate the functionality of a Near-Field Communication (NFC) payment card including maintaining payment tokens, cryptographic keys, and the like in order to allow for mobile payments using NFC. Other electronic devices may use Host Card Emulation (HCE) to enable NFC payment functionality. With HCE, the operating system of the mobile device may emulate the functional responses of an NFC card, instead of relying on a hardware SE.

Current HCE-based mobile wallets may rely on online or cloud-based infrastructure to generate payment credentials which are then delivered over a communications network (such as, for example, over-the-air and/or via Internet) to the mobile wallet application of an electronic device so that the electronic device can engage in standard EMV payment transactions at the point-of-sale.

Typically, in HCE-based mobile wallet scenarios, the payment credentials are temporary—for example, one-time or limited-time ("n-time") use temporary payment credentials may be provided. Temporary credentials may help to reduce to the risk and/or impact of credential compromise such as, for example, where a mobile device is lost or stolen.

Temporary payment credentials typically include a temporary payment token and a temporary cryptographic key which is bound to the temporary payment token and used as a session key for calculating the EMV transaction cryptogram such as when used in performing a payment transaction.

In HCE-based mobile wallet scenarios, cloud infrastructure is typically employed to generate and safely store/protect the aforementioned temporary cryptographic keys, to link the temporary cryptographic keys to temporary payment token, to map the temporary payment token to an underlying payment account number (PAN) of a payment account used to fund the transactions, and to provision the aforementioned temporary payment tokens and corresponding cryptographic data to the mobile wallet application as described above. For example, Trusted Service Manager (TSM) infrastructure may be employed. In some scenarios, the cloud infrastructure may need to maintain master cryptographic keys or material such as may be employed in deriving or generating the aforementioned temporary cryptographic keys.

Notably, cryptographic keys stored and protected in the cloud may represent a vulnerability. For example, an attacker compromising such keys may be able to employ them in order to effect fraudulent payment transactions. In an effort to mitigate such risk, sophisticated infrastructure is often employed such as to establish a secure channel between the cloud infrastructure and the mobile wallet application on an electronic device. This infrastructure can, however, also be a potentially lucrative target for attackers. More broadly, maintaining infrastructure such as TSMs subject to such risks can result in increased cost and technical complexity for deployment of a mobile payment system.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
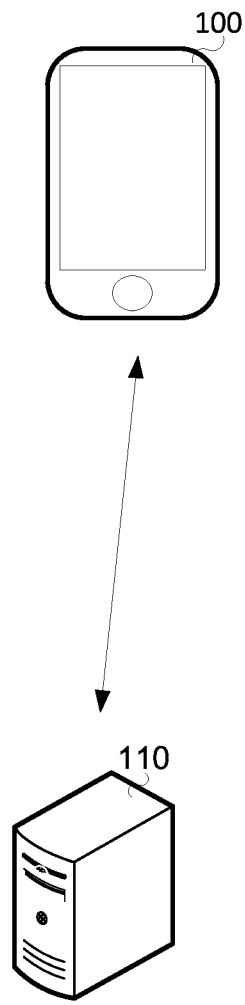
FIG. 1 is a schematic operation diagram illustrating an operating environment of an example embodiment.

In one aspect, there is provided a computer system that includes a processor; a storage module coupled to the processor; a communications module coupled to the processor; and, a memory coupled to the processor. The memory stores instructions that, when executed by the processor, cause the computer system to receive from an electronic device, via a network using the communications module, a de-tokenization request, the de-tokenization request including a payment token and a cryptogram, the cryptogram having been generated by the electronic device using a session key generated by the electronic device based on a fingerprint of the electronic device, a secret value previously shared with the electronic device, the payment token, and a transaction counter; retrieve, based on the payment token, the fingerprint, the secret value, and the transaction counter from storage using the storage module; generate the session key based on the fingerprint, the secret value, the payment token, and the transaction counter; verify the cryptogram using the session key; upon successfully verifying the cryptogram, retrieve an account number associated with the payment token; and send to the electronic device, via the network using the communications module, a response to the de-tokenization request including the account number.

In another aspect, there is provided a computer-implemented method that includes receiving, from an electronic device via a network, a de-tokenization request, the de-tokenization request including a payment token and a cryptogram, the cryptogram having been generated by the electronic device using a session key generated by the electronic device based on a fingerprint of the electronic device, a secret value previously shared with the electronic device, the payment token, and a transaction counter; retrieving, based on the payment token, the fingerprint, the secret value, and the transaction counter; generating the session key based on the fingerprint, the secret value, the payment token, and the transaction counter; verifying the cryptogram using the session key; upon successfully verifying the cryptogram, retrieving an account number associated with the payment token; and sending, to the electronic device via the network, a response to the de-tokenization request including the account number.

In another aspect, there is provided a computer-implemented method of preparing an electronic device for performing a payment transaction. The method includes sending, via a network, a request including an account reference number and a fingerprint of the electronic device; receiving, via the network, a response to the request, the response including a secret value and a payment token based on an account number, wherein the account number is identified based on an association with the account reference number; and generating a session key for use in performing the payment transaction based on the fingerprint, the secret value, the payment token, and a transaction counter.

In some embodiments, one of more benefits may be realized. In an example, by establishing session keys the need for complicated cloud based infrastructure such as, for example, TSM services, may be limited or eliminated. Additionally or alternatively, the need to store and manage temporary cryptographic keys in the cloud may be limited or eliminated. Conveniently, in this way, reduced cost and/or complexity may be realized. Further, establishing session keys in accordance with the present application may provide equivalent security to some cloud based generation of keys. Further, establishing session keys in accordance with some example implementations of the present application may improve security since sensitive keys do not need to be stored (even on a temporary basis) in the cloud.

As further discussed below, some embodiments may not require any modification of existing payment networks or the protocols employed to communicate thereon. Further, in some implementations, no changes to various computer systems interconnected therewith are required, other than to the electronic device hosting the payment wallet using HCE and to the tokenization service provider and/or the HCE provisioning backend. As the endpoints that may be modified may be entirely under the control of a single financial institution, such embodiments may be advantageous due to ease of deployment.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a computer server system 110 is in communication with an electronic device 100.

The electronic device 100 is a computing device. In some embodiments, the electronic device 100 may be a portable electronic device. For example, the electronic device 100 may, as illustrated, be a smartphone. However, the electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), a smart appliance (e.g., a smart or "Internet-of-things" refrigerator), and any other type of computing device that may be configured to store data and software instructions, and execute software instructions to perform operations consistent with disclosed embodiments. In certain embodiments, the electronic device 100 may be associated with one or more users. For instance, a user may operate the electronic device 100, and may do so to cause the electronic devices to perform one or more operations consistent with the disclosed embodiments. In some embodiments, the electronic device 100 may include a smart card, chip card, integrated circuit card (ICC), and/or other card having an embedded integrated circuit.

As further described below, the electronic device 100 may include a payment application for making data transfers corresponding to particular payment methods. For example, the electronic device 100 may be used to make payments using near-field communication (NFC). The electronic device 100 may use host-card emulation (HCE) in order to make NFC payments according to industry standard protocols, including ISO/IEC 14443 (2016), the contents of all parts of which are incorporated herein by reference in their entirety, and/or according to relevant EMV standards as published by EMVCo.

In some embodiments, the electronic device 100 may perform data transfers with devices such as, for example, point-of-sale (POS) terminals (not shown), also referred to as payment terminals. In an example, a data transfer between the electronic device 100 and a terminal may be made to process a payment to a party, such as a merchant, associated with the terminal. For example, as further described below, the electronic device 100 may transmit a secure token and an EMV cryptogram to the terminal during a transaction. A POS terminal uses this information in order to determine whether a transaction is to be approved or declined. The information may be transmitted over a short-range communication system, such as an NFC interface. As further described below, the EMV cryptogram is encrypted with a session key. As further described below, a common session key may be established between the electronic device 100 and the computer server system 110 in accordance with the present application.

The computer server system 110 is also a computer device. The computer server system 110 may, for example, be a mainframe computer, a minicomputer, or the like. The computer server system 110 may include one or more computing devices. For example, a computer server system 110 may include multiple computing devices such as, for example, database servers, compute servers, and the like. The multiple computing devices may be in communication using a computer network. For example, computing devices may communicate using a local-area network (LAN). In some embodiments, the computer server system 110 may include multiple computing devices organized in a tiered arrangement. For example, the computer server system 110 may include middle-tier and back-end computing devices. In some embodiments, the computer server system 110 may be a cluster formed of a plurality of interoperating computing devices.

As further described below, the computer server system 110 may act as a tokenization service provider. In some embodiments, the computer server system 110 may also act as an HCE provisioning backend. Alternatively, separate computer server systems may be provided to act as tokenization service provider and/or HCE provisioning backends. For example, multiple computer systems may be provided that communicate via a network (not shown).

Figure 2:
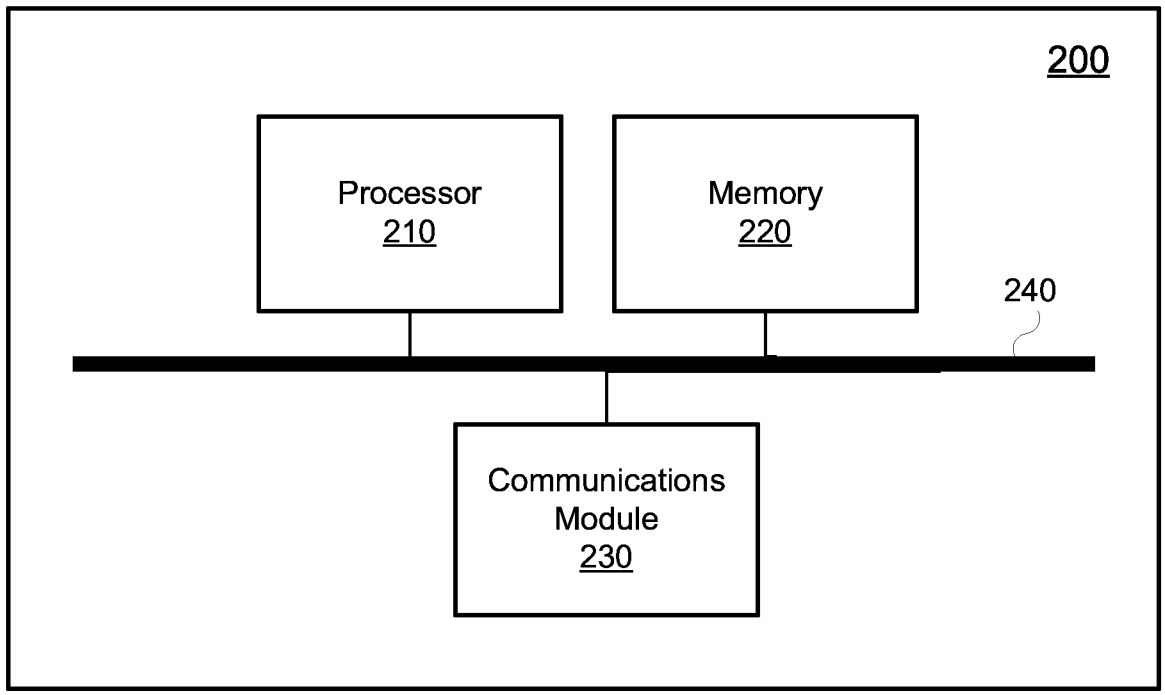
FIG. 2 is a high-level operation diagram of an example computing device.

FIG. 2 is a high-level operation diagram of an example computing device 200. In some embodiments, example computing device 200 may be exemplary of one or both of the electronic device 100 and computer server system 110. As will be discussed in greater detail below, both the electronic device 100 and the computer server system 110 include software that adapts each to perform a particular function. More particularly, the electronic device 100 and the computer server system 110 may co-operate, directly or indirectly, in order to provision the electronic device 100 for performing a payment transaction and/or to perform a payment transaction.

The example computing device 200 includes a variety of modules. For example, as illustrated, the example computing device 200 may include a processor 210, a memory 220, and a communications module 230. As illustrated, the foregoing example modules of the example computing device 200 are in communication over a bus 240.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as, for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using NFC, via Wi-Fi™, using Bluetooth™ or via some combination of one or more networks or protocols. As described above, contactless payments may be made using NFC. In some embodiments, all or a portion of the communications module 230 may be integrated into a component of the example computing device 200. For example, the communications module 230 may be integrated into a communications chipset.

Software instructions are executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
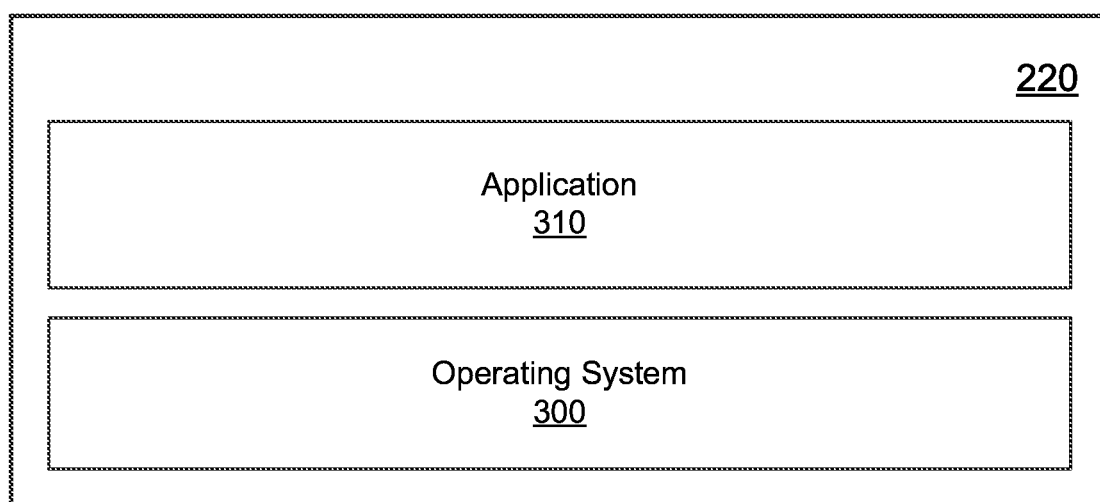
FIG. 3 depicts a simplified software organization exemplary of the example computing device of FIG. 2.

FIG. 3 depicts a simplified organization of software components stored in the memory 220 of the example computer device 200. As illustrated these software components include an operating system 300 and an application 310.

The operating system 300 is software. The operating system 300 allows the application 310 to access the processor 210, the memory 220, and the communications module 230. The operating system 300 may be, for example, UNIX™, Linux™, Microsoft™ Windows™, Apple™ OSX™, Google™ Android™, Apple™ iOS™ or the like.

The application 310 adapts the example computing device 200, in combination with the operating system 300, to operate as a device to a particular function. For example, application 310 may cooperate with the operating system 300 to adapt a suitable embodiment of the example computing device 200 to operate as the electronic device 100 or computer server system 110.

The operation of each of the electronic device 100 and the computer server system 110 will be described below with reference to FIGS. 4-12.

Figure 4:
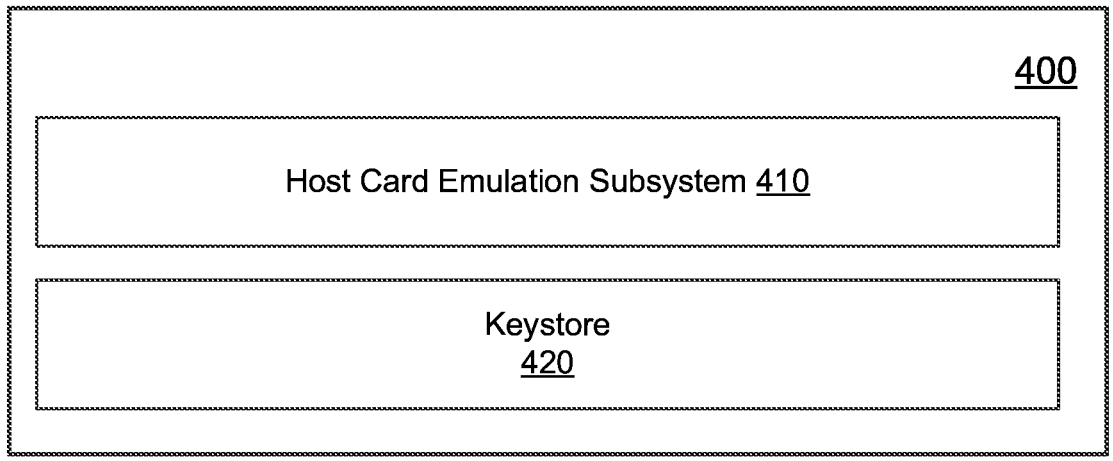
FIG. 4 depicts a simplified software organization exemplary of an electronic device.

FIG. 4 depicts a simplified organization of software components stored in the memory 400 of the electronic device 100. As illustrated these software components include a host card emulation subsystem 410 and a keystore 420.

The host card emulation subsystem 410 is responsible for emulating the functionality of an NFC payment card. In some embodiments, all or a portion of the host card emulation subsystem 410 may be provided by the operating system of the electronic device 100. In some embodiments, the host card emulation subsystem 410 may also provide user facing mobile wallet components such as, for example, a user interface. In other embodiments, the host card emulation subsystem 410 may co-operate with a mobile wallet application in order to expose mobile payment functionality to a user.

The keystore 420 is responsible for providing secure storage and management of cryptographic material such as, for example, cryptographic keys. The keystore 420 may utilize a trusted execution environment (TEE) of a processor of the electronic device 100. Additionally or alternatively, a security co-processor may be utilized. For example, a secure enclave co-processor, such as those provided by Apple Inc. with certain iOS devices, may be utilized.

Figure 5:
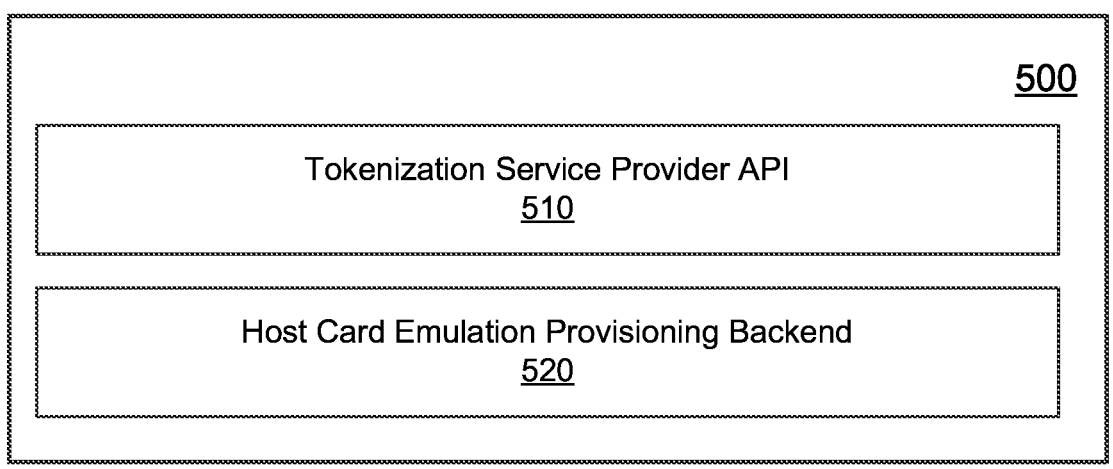
FIG. 5 depicts a simplified software organization exemplary of a server computing device.

FIG. 5 depicts a simplified organization of software components stored in the memory 500 of the computer server system 110. As illustrated these software components include a tokenization service provider application programming interface (API) 510 and a host card emulation provisioning backend 520.

The tokenization service provider API 510 exposes token management services provided by the computer server system 110. As further described below, the tokenization service provider API 510 may allow payment tokens to be mapped to corresponding payment account numbers during processing of payment transactions.

The host card emulation provisioning backend 520 may cooperate with components operating on remote devices in order to provision those devices for making payments. For example, the host card emulation provisioning backend 520 may cooperate with the host card emulation subsystem 410 of the electronic device 100 in order to provision it for making a next one or more payments. Additionally, as further described below, the host card emulation provisioning backend 520 may cooperate with the tokenization service provider API 510 in order to validate cryptograms during processing of payment transactions.

Figure 6:
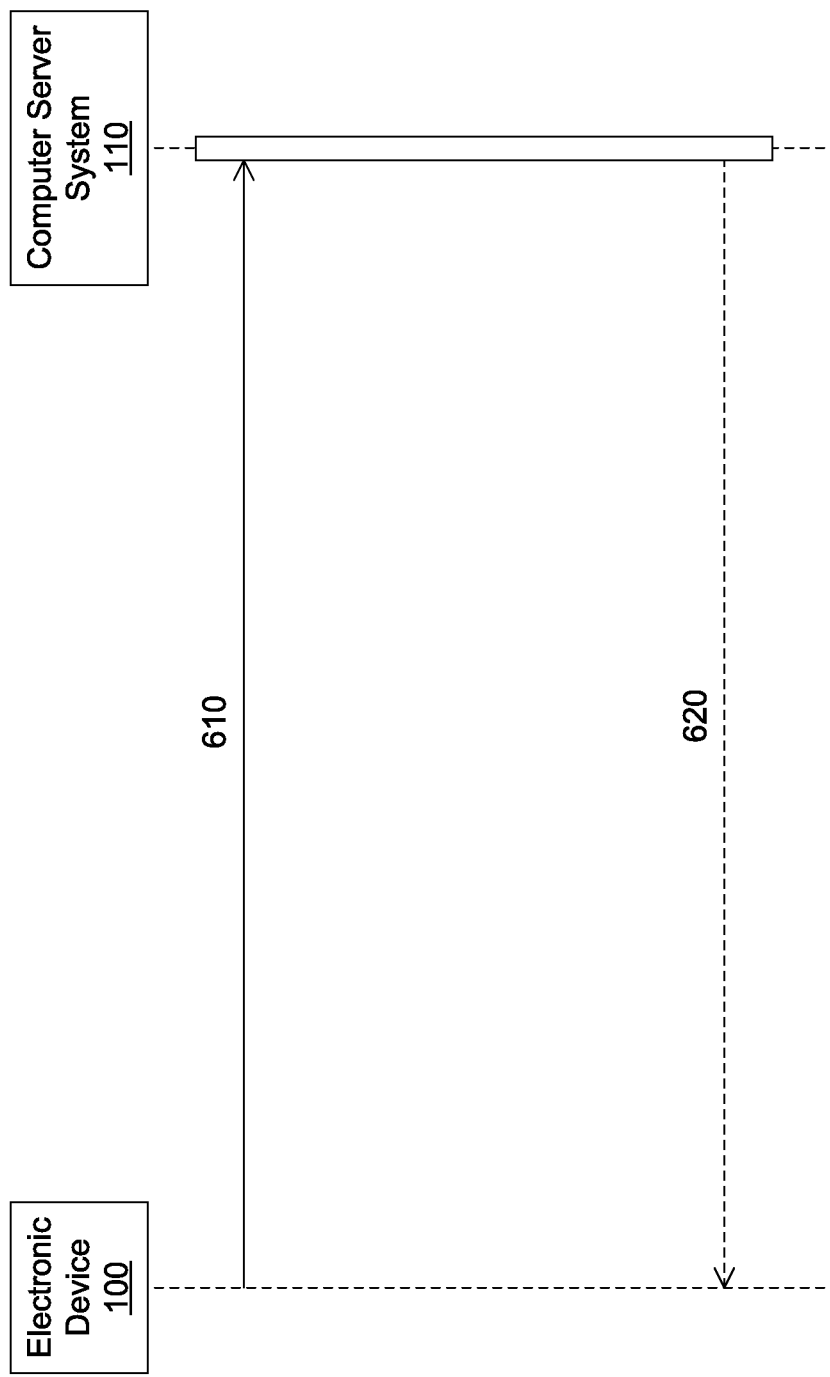
FIG. 6 is a sequence diagram depicting data transfers between computer systems, exemplary of an embodiment.

FIG. 6 is a sequence diagram illustrating communications between the electronic device 100 and the computer server system 110 in order to provision the host card emulation subsystem 410 of the electronic device 100 for performing a next one or more payments.

As further discussed below, in some embodiments, such as, for example, if one-time use payment credentials are utilized, such provisioning may be performed in preparation for each payment. In other embodiments, such provisioning may only be performed periodically such as, for example, if n-time use payment credentials are utilized.

As illustrated, the electronic device 100 and the computer server system 110 communicate by exchanging messages.

In some embodiments, these messages may correspond one-to-one with messages in an underlying communication protocol. For example, the messages may correspond to particular packets exchanged between the electronic device 100 and the computer server system 110. In other embodiments, the messages may only be conceptual and may be mapped to more than one underlying communication.

In some embodiments, the messages may be exchanged over a secure channel. A secure channel may be established using known cryptographic techniques. In some embodiments, well-known protocols related to communications security may be employed. Internet Protocol Security (IPsec) and/or Secure Sockets Layer (SSL) and/or Transport Layer Security (TLS) or similar technologies may be employed.

As illustrated, the electronic device 100 sends a provisioning request 610 to computer server system 110. As further discussed below, the request may include an account reference number and a fingerprint of the electronic device 100.

Upon receipt, the computer server system 110 performs processing to generate a provisioning reply 620.

Figure 7:
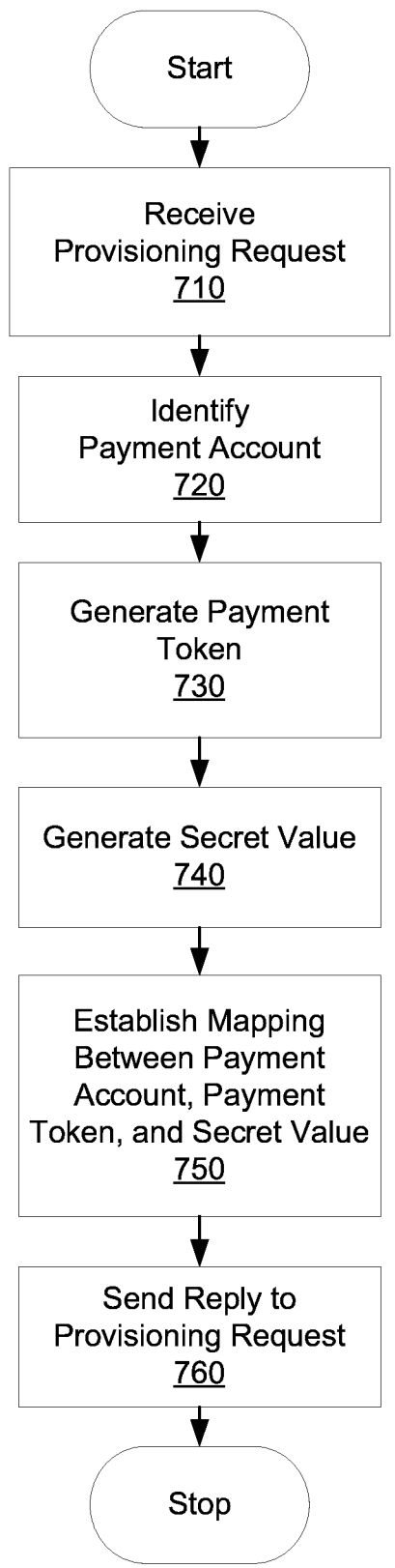
FIG. 7 is a flowchart depicting example operations performed by a computer system of FIG. 6.

The processing performed by the computer server system 110 is described with reference to the flowchart of FIG. 7. Operations 710 and onward are performed by one or more processors of a computing device, such as for example the processor 210 of a suitably configured instance of the example computing device 200, executing software such as, for example, the host card emulation provisioning backend 520.

At the operation 710, the computer server system 110 receives the provisioning request 610 from the electronic device 100. As discussed, the provisioning request may include an account reference number and a fingerprint of the electronic device 100.

In some embodiments, the account reference number may be a payment account reference (PAR) as defined Specification Bulletin No. 167 (January 2016) by EMVCo. or according to the EMV® Payment Tokenisation Specification—Technical Framework, (v2.0, September 2017, available from EMVCo), the contents of both of which are incorporated herein by reference in their entirety.

The account reference number may be stored in and retrieved from a secure storage region of the electronic device 100 in order to populate the provisioning request 610. For example, the account reference number may be retrieved from storage in the keystore 420. In some embodiments, storage of the account reference number may utilize a trusted execution environment (TEE) of a processor of the electronic device 100 and/or a security co-processor thereof.

The fingerprint of the electronic device 100 is a unique identifier of the electronic device 100. The fingerprint may be based on some or all of data stored in the electronic device 100. For example, the fingerprint may be based on some or all of the data stored in the memory 220 where the electronic device 100 is an instance of the example computing device 200. Additionally or alternatively, the fingerprint may be based on an International Mobile Station Equipment Identity (IMEI) associated with the electronic device 100, an International Mobile Subscriber Identity (IMSI) associated with electronic device 100, and/or an Integrated Circuit Card Identifier (ICCID) of a Subscriber Identity Module (SIM) coupled to or otherwise associated with the electronic device 100, such as, for example, when the electronic device 100 is a smartphone. In some embodiments, one or more of the aforementioned pieces of data may be combined in order to generate the fingerprint. For example, data may be combined through concatenation of various pieces of data or portions thereof. In some embodiments, a hash function may be employed in order to generate the fingerprint as a fixed length unique identifier of the electronic device 100. For example, a cryptographic hash function such as, for example, one or more of MD-4, MD-5, SHA-1, a hash function from the SHA-2 suite, a hash function from the SHA-3 suite, or the like, may be utilized.

Following receipt of a provisioning request, control flow proceeds to an operation 720.

At the operation 720, a payment account is identified. This may include performing a lookup to determine a payment account associated with the account reference number. For example, where the account reference number is a PAR, a payment account number (PAN) associated with that PAR may be determined.

Following the operation 720, control flow proceeds to an operation 730.

At the operation 730, the processor causes a payment token to be generated. As further discussed below, the payment token may be utilized by the electronic device 100 in performing a payment transaction.

The payment token may be generated based on the payment account. For example, where a PAN was determined at the operation 720, it may be utilized in payment token generation. For example, the generated payment token may be an payment account number (PAN) token. In a particular example, a PAN token may be generated in accordance with the EMV® Payment Tokenisation Specification—Technical Framework, (v2.0, September 2017, available from EMVCo) and related bulletins, the contents of all of which are incorporated herein by reference in their entirety.

Following the operation 730, control flow proceeds to an operation 740.

At the operation 740, the processor causes a secret value to be generated.

The secret value may be of an unsigned integer of a predefined length. For example, the secret value may be 64, 128, 256 or 512 bits in length.

The secret value may be a random number. The secret value may be generated using a suitable random number generator. For example, the secret value may be generated using a cryptographically secure pseudo-random number generator. Additionally or alternatively, a hardware random number generator may be employed. In some embodiments, a random number generator of a trusted execution environment (TEE) and/or a security co-processor thereof may be employed.

Following the operation 740, control flow proceeds to an operation 750.

At the operation 750, the processor causes a mapping to be established between the payment account, the payment token, and the secret value. As an example, if a PAN was determined in association with the payment account, and the payment token is a PAN Token, then a mapping may be established between the PAN, the PAN token, and the secret value. Further, to assist in processing the mapping may be a mapping between the PAN, the PAR, the PAN token, and the secret value.

Following the operation 750, control flow proceeds to the operation 760.

At the operation 760, the processor causes the provisioning reply 620 (FIG. 6) to be sent to the electronic device 100. The provisioning reply 620 is a reply to the provisioning request 610 (FIG. 6). The provisioning reply 620 may be sent via a network such as, for example, by way of the communications module 230 where the electronic device 100 is an instance of the example computing device 200.

The provisioning reply 620 includes the secret value and the payment token. As such, in some embodiments, the provisioning reply 620 may include a fixed length random number and a PAN token.

Figure 8:
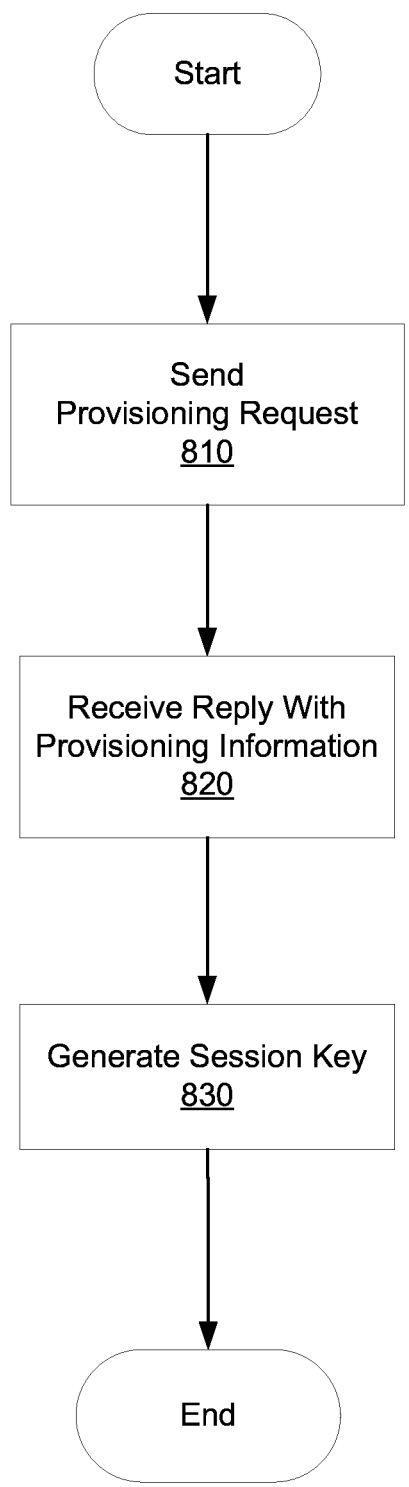
FIG. 8 is a flowchart depicting example operations performed by another computer system of FIG. 6.

Operations performed by the electronic device 100, including operations performed in response to the provisioning reply 620, will now be described with reference to the flowchart of FIG. 8. Operations 810 and onward are performed by one or more processors of a computing device, such as for example the processor 210 of a suitably configured instance of the example computing device 200, executing software such as, for example, the host card emulation subsystem 410.

At the operation 810, the processor causes the provisioning request 610 to be sent to the computer server system 110. As discussed above, the provisioning request 610 may include an account reference number and a fingerprint of the electronic device 100.

As discussed above, in some embodiments, the account reference number may be stored in a secure fashion in the electronic device 100. For example, the account reference number may be stored and retrieved using a trusted execution environment of the electronic device 100. In another example, the account reference number may be stored an retrieved from a trusted key store such as, for example, the keystore 420. In some embodiments, it may be that, as described above, the keystore 420 utilizes a trusted execution environment of the electronic device 100. More broadly, storage of the account reference number may utilize a trusted execution environment (TEE) of a processor of the electronic device 100 and/or a security co-processor thereof.

Following transmission of the provisioning request 610, control flow will proceed to the operation 820 where the provisioning reply 620 is received.

As discussed above, the provisioning reply 620 is a response to the provisioning request 610. As discussed above, the response includes a secret value and a payment token based on an account number that is identified at computer server system 110 based on an association with the account reference number that was included in the provisioning request 610.

Following the receipt of the provisioning reply 620 at the operation 820, control flow proceeds to the operation 830.

At the operation 830, the processor causes a session key to be generated. The session key may be used in performing a payment transaction.

The session key is generated based on the above-discussed fingerprint of the device, the secret value and the payment token received in the provisioning reply 620. Additionally, the generation of a session key may also take into account a transaction counter. In other words, it may be that the session key is generated based on the above discussed fingerprint of the device, the secret value and the payment token received in the provisioning reply 620, and the transaction counter.

The transaction counter is a counter that increases as payment transactions are performed using a payment account associated with the account reference number. For example, the transaction counter may be an EMV application transaction counter (ATC) such as may be maintained by both the electronic device 100 and the payment account issuer. Including the transaction counter as an input to session key generation may improve resistance to replay attacks such as where an attacker attempts to reuse a session key. The session key may be generated by combining one or more of the above inputs and using an algorithm similar to the algorithm described in EMV 4.1, Book 2 Session and Key Management, (May 2004), Part II, A1.3, the contents of which are incorporated herein by reference in their entirety.

In some embodiments, one or more variations the triple data encryption standard (3DES) cipher algorithm may employed in key generation. 3DES is defined in, for example, ANSI X9.52-1998 "Triple Data Encryption Algorithm Modes of Operation", the contents of which are incorporated herein by reference in their entirety. For example, in some embodiments, the session key may be generated using one or more applications of a double-length key triple data encryption standard cipher algorithm.

In a particular example, a session key may be generated using a variation of the scheme set-out in section 5.2 of the EMV Card Personalization Specification (June 2003) by EMVCo, the contents of which are incorporated herein by reference in their entirety. Alternatively, a session key may be generated using another scheme such as, for example, EMV2000, EMV CSK, Mastercard SK, or the like. In some embodiments, a particular session key generation scheme may be selected based on the particular one or more payment networks being employed or utilized.

Additionally or alternatively, generation of the session key may employ a cryptographic hash function. For example, a cryptographic hash function such as, for example, one or more of MD-4, MD-5, SHA-1, a hash function from the SHA-2 suite, a hash function from the SHA-3 suite, or the like may be utilized. In some embodiments, the session key may be generated by applying a cryptographic hash function one or more times to various of the inputs. Put differently, in some embodiments, the session key may be generated by applying a cryptographic hash function one or more times using the fingerprint, the secret value, the payment token, and the transaction counter as inputs, with the latter being included only if the transaction counter is to be utilized in key generation.

In a particular example, a cryptographic hash function may be used to construct a keyed-hash message authentication code (HMAC). For example, the HMAC construction set out in RFC 2104, "HMAC: Keyed-Hashing for Message Authentication" (February 1997) by H. Krawczyk et al., the contents of which are incorporated herein by reference in their entirety, may be employed. The HMAC may then be used to derive a key such as, for example, by using the Password-Based Key Derivation Function 2 (PBKDF2). PBKDF2 is defined in RFC 2898, "PKCS #5: Password-Based Cryptography Specification Version 2.0" (September 2000) by B. Kaliski, the contents of which are incorporated herein by reference in their entirety.

The session key may be stored by the electronic device 100. For example, the session key may be stored using a trusted execution environment of the electronic device 100. In another example, the session key may be stored and retrieved from a trusted key store such as, for example, the keystore 420. In some embodiments, it may be that, as described above, the keystore 420 utilizes a trusted execution environment of the electronic device 100. More broadly, storage of the session key may utilize a trusted execution environment (TEE) of a processor of the electronic device 100 and/or a security co-processor thereof.

Following generation of the session key, the electronic device 100 has been provisioned for performing a next transaction.

Figure 9:
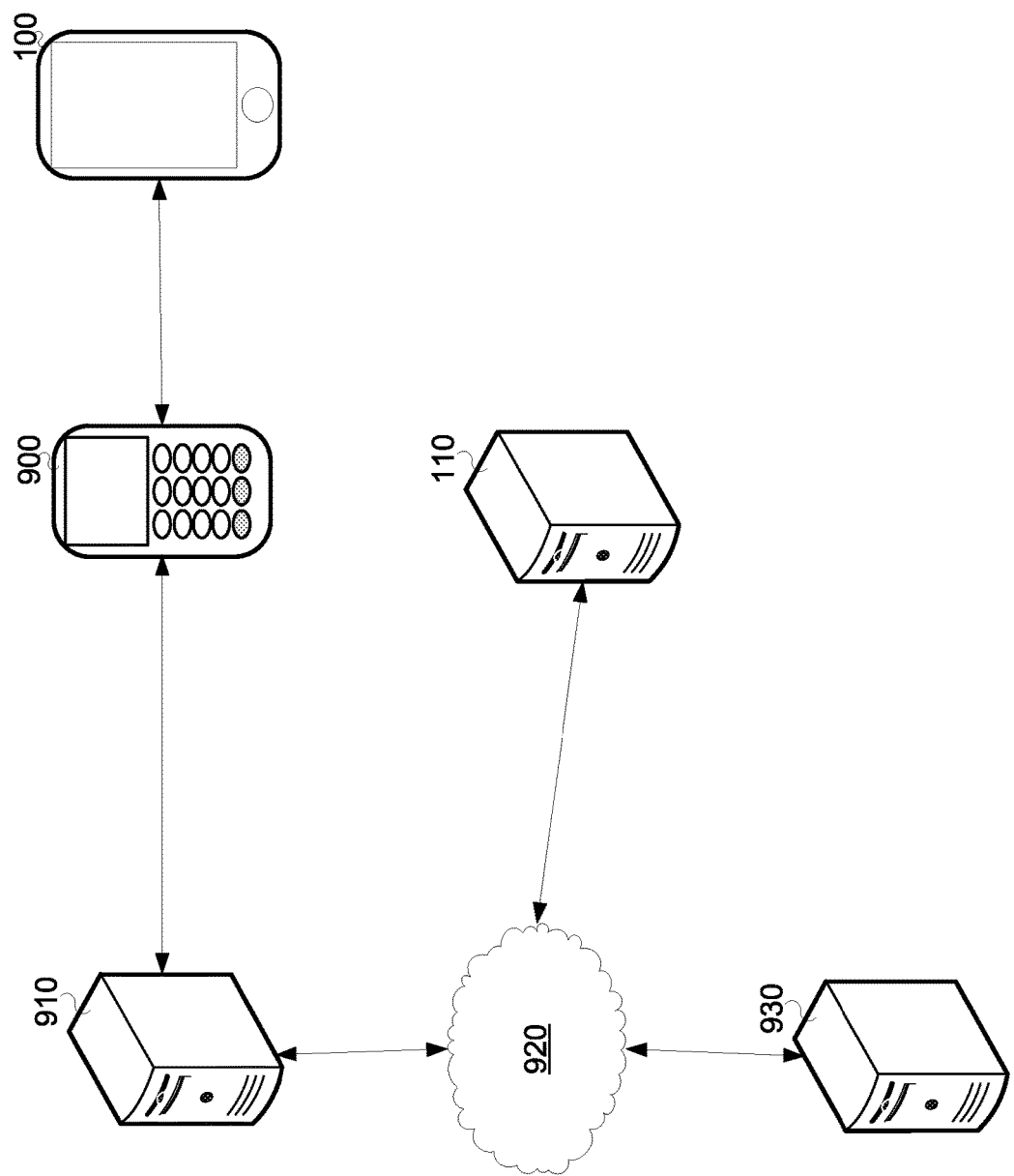
FIG. 9 is a schematic operation diagram illustrating an operating environment of an example embodiment.

FIG. 9 is a schematic diagram illustrating an example operating environment for performing a payment transaction.

As illustrated, the electronic device 100 is in communication with a terminal 900. Terminal 900 may, for example, be a point-of-sale terminal as discussed above.

In some embodiments, communication between the electronic device 100 may be by way of NFC.

The terminal 900 is, in turn, in communication with an acquirer computer system 910. The terminal 900 may communicate with the acquirer computer system 910 using a computer network such as, for example, the Internet. In some embodiments, the communication between the terminal 900 and the acquirer computer system 910 may be performed using the public switched telephone network (PSTN).

The acquirer computer system 910 is operated by or on behalf of a bank or financial institution that processes payment transactions on behalf of a merchant associated with terminal 900. That institution, known as the acquiring bank or the acquirer, may provide a merchant account to the merchant.

The acquirer computer system 910 is in communication with the computer server system 110 and an issuer authorization host computer system 930 by way of a payment network 920.

The acquirer computer system 910 and the issuer authorization host computer system 930 are both computer systems. In some embodiments, one or both of the acquirer computer system 910 and the issuer authorization host computer system 930 may be a suitably configured instance of example computing device 200.

The issuer authorization host computer system 930 is operated by or on behalf of an issuing bank or financial institution that issued the payment account being used for the payment transaction. The issuer authorization host computer system 930 is responsible for authorizing the payment transaction. For example, this may include determining if the account has sufficient available funds or available credit based on the terms of the payment account including for example, whether it is a debit or a credit account and any associated credit limit.

The payment network 920 is a computer network that provides communication between the participants in payment transactions. The payment network 920 may be a global payment network operated by a card payment organization such as, for example Visa, MasterCard, or American Express. For example, the payment network 920 may be VisaNet™ (operated by Visa) or Banknet (operated by MasterCard).

Figure 10:
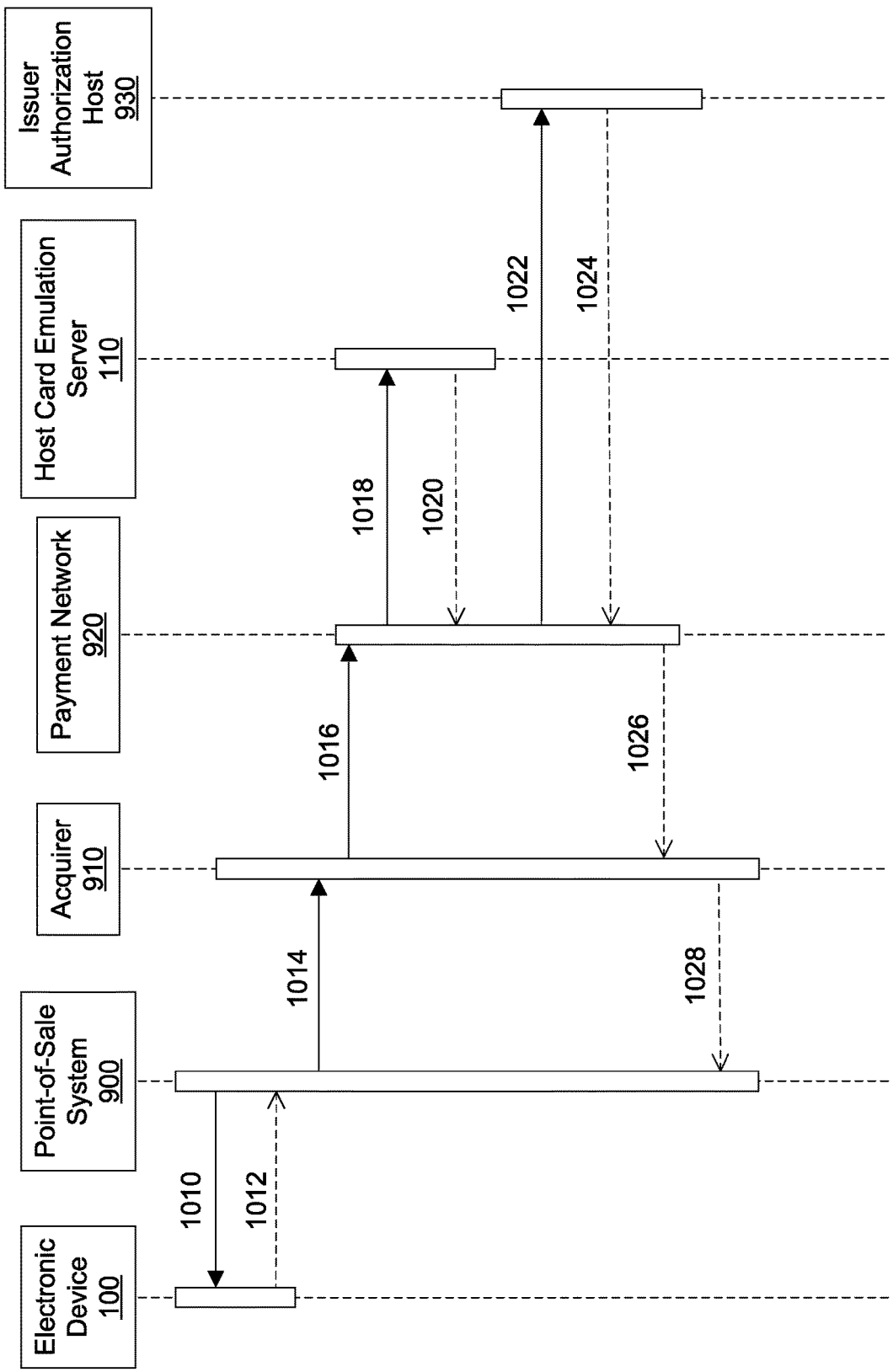
FIG. 10 is sequence diagram depicting data transfers between computer systems, exemplary of an embodiment.

FIG. 10 is a sequence diagram illustrating communications amongst the networked participants of FIG. 9 in performing a payment transaction.

The following explanation is simplified and does not show all of the messages needed to perform a transaction. In particular, the message flow relevant to payment transaction authorization is discussed below. Additional messages used to enable a complete payment transaction are known to persons of ordinary skill in the art. For example, such messaging may be in accordance with the various parts of ISO Standard No. 8583 including ISO 8583-1:2003, "Financial transaction card originated messages—Interchange message specifications—Part 1: Messages, data elements and code values" (June 2003). The contents of all parts of ISO Standard No. 8583 are incorporated herein by reference in their entirety.

Referring to FIG. 10, the explanation of the portion of the processing of the payment transaction begins at a point where a message 1010 is sent by the terminal 900 to the electronic device 100. In some embodiments, however, this may not be the first communications and earlier messages (not illustrated) may have been exchanged in order to initiate the transaction, for handshaking, or the like.

The message 1010 may sent by the terminal 900 to the electronic device 100 wirelessly, such as for example using NFC.

The exchange of FIG. 10 presumes that provisioning of the electronic device 100 and the computer server system 110 has already been performed and that, in particular, the electronic device 100 has been provisioned with a payment token and that electronic device 100 and the computer server system 110 have established a common shared secret. Further, it is presumed that electronic device 100 previously shared a fingerprint of the electronic device 100 with the computer server system 110. In some embodiments, the provisioning of electronic device 100 may, for example, have occurred in accordance with foregoing including the description of FIGS. 6-8 resulting in the aforementioned conditions being satisfied.

Figure 11:
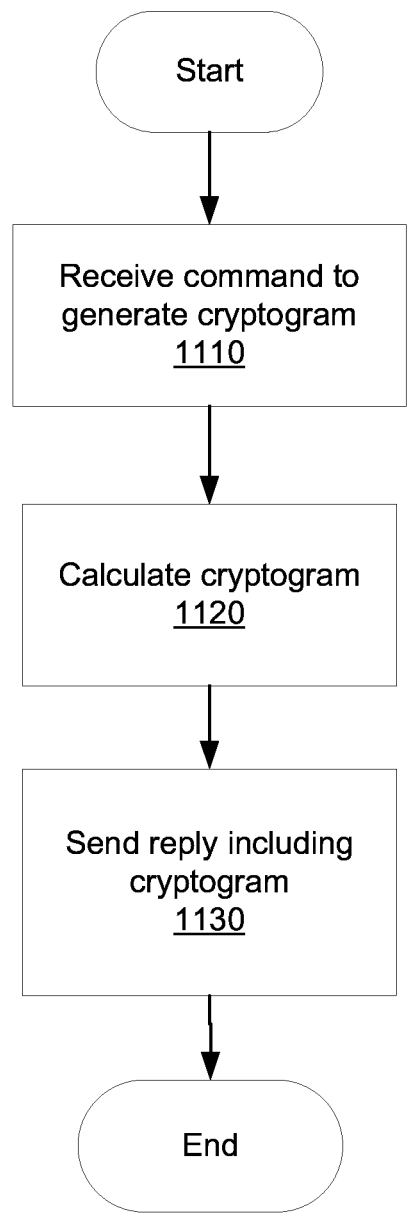
FIG. 11 is a flowchart depicting operations performed by a computer system of FIG. 10.

Processing of message 1010 by the electronic device 100 is explained by reference to FIG. 11. In particular, operations performed by the electronic device 100, including operations performed in response to the message 1010, will now be described with reference to the flowchart of FIG. 11. Operations 1110 and onward are performed by one or more processors of a computing device, such as for example the processor 210 of a suitably configured instance of the example computing device 200, executing software such as, for example, the host card emulation subsystem 410.

At the operation 1110, the message 1010 is received by the electronic device 100. Message 1010 is a trigger for the electronic device 100 to generate a cryptogram.

In some embodiments, message 1010 may be or may include a GenerateAC command as defined in EMV Specification Version 4.3 Book 3—Application Specification (28

Nov. 2011), the contents of which are incorporated herein by reference in their entirety. In such embodiments, the message 1010 may include the expected contents for a GenerateAC command such as, for example, data that may be specified by a Card Risk Management Data Object List (CDOL).

Following the operation 1110, control flow proceeds to an operation 1120.

At the operation 1110, the processor causes a cryptogram to be calculated based on data from the message 1010. The cryptogram can be verified by the issuer so as to confirm the legitimacy of the payment transaction.

The cryptogram is generated based on the session key. A session key may be generated in manners described above in relation to the description of the operation 830 (FIG. 8). As such a session key may be generated based on a fingerprint of the electronic device 100, a secret value previously shared with the electronic device 100, a payment token previously shared with the electronic device 100. In some embodiments, a transaction counter may also factor into the generation of the session key. For example, the session key may be based on the fingerprint, the secret value, the payment token, and the transaction counter.

In some embodiments, such as, for example, when message 1010 is or includes a GenerateAC command, the cryptogram may be an EMV cryptogram such as, for example, an Application Cryptogram. More particularly, the cryptogram may be an EMV Authorization Request cryptogram. In a particular example, an EMV cryptogram may be generated using inputs including the session key, the PAN token, the EMV ATC. An EMV cryptogram may be generated in accordance with EMV standards and/or standards published by card networks Following the operation 1120, control flow proceeds to an operation 1130.

At the operation 1130, the processor causes a reply to the message 1010 (FIG. 10) to be sent. The reply includes the cryptogram and the payment token. For example, in embodiments according to EMV standards, the reply may include an application cryptogram as discussed above and a PAN token. The reply may be sent via NFC such as, for example, by way of the communications module 230 where the electronic device 100 is an instance of the example computing device 200.

Returning to FIG. 10, the aforementioned reply message is illustrated as a message 1012.

As described above, the terminal 900 and the acquirer computer system 910 are in communication with each other. Via such communication and responsive to the message 1012, the terminal 900 sends an authorization message 1014 to the acquirer computer system 910.

The authorization message 1014 is a request to authorize the payment transaction. The authorization message includes the cryptogram and the payment token from the message 1012. For example, in some embodiments, the authorization message 1014 may be or may include an ISO 8583 authorization message with DE 55/Field 55 data including an application cryptogram (the cryptogram) and a PAN token (the payment token).

As described above, the acquirer computer system 910 is in communication with a payment network 920. Using such communication, the authorization message 1014 is forwarded to the payment network 920 as a message 1016.

Responsive to authorization message 1014, the payment network 920 needs to verify the cryptogram and to detokenize the payment token so that the authorization can be processed by the issuer authorization host computer system 930. Accordingly, the payment network sends a request 1018 including the cryptogram and the payment token to the computer server system 110.

Figure 12:
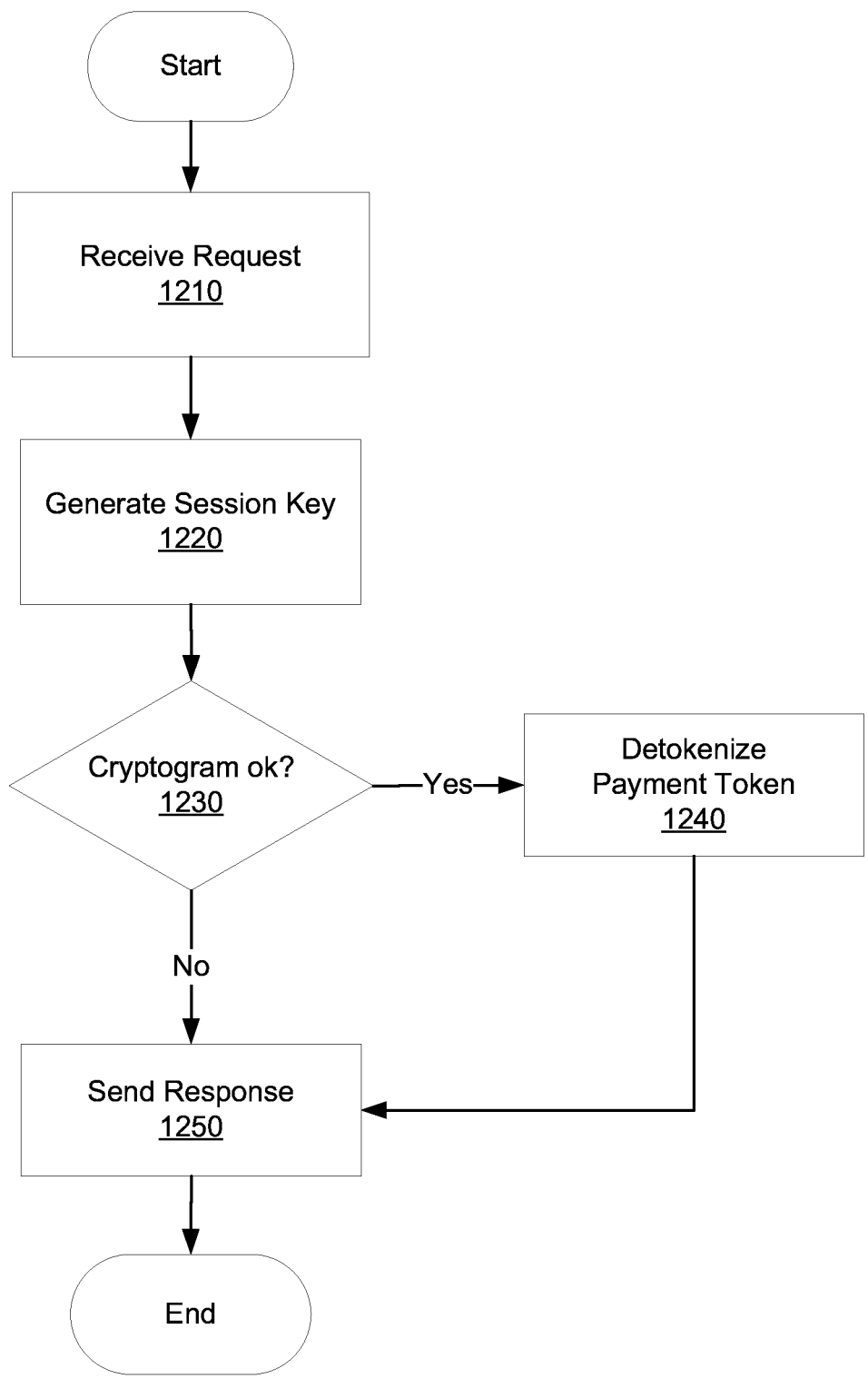
FIG. 12 is a flowchart depicting operations performed by another computer system of FIG. 10.

Processing of request 1018 by the computer server system 110 is explained by reference to FIG. 12. In particular, operations performed by the computer server system 110, including operations performed in response to the request 1018, will now be described with reference to the flowchart of FIG. 12. Operations 1210 and onward are performed by one or more processors of a computing device, such as for example the processor 210 of a suitably configured instance of the example computing device 200, executing software such as, for example, the tokenization service provider API 510 and/or the host card emulation provisioning backend 520.

At the operation 1110, the request 1018 is received by the computer server system 110. For example, the request 1018 may be received, for example, by way of the communications module 230 where the electronic device is an instance of the example computing device 200.

Following receipt of the request 1018, control flow proceeds to an operation 1220.

At the operation 1120, the processor causes a session key to be generated. As further discussed below, the session key will be used to verify the cryptogram. Notably, this session key will be the same session key that was used by the electronic device 100 in generation of the cryptogram at operation 1120 (FIG. 11). Conveniently, the computer server system 110 is able to generate the same session key because it has access to the same values used by the electronic device 100 in generating the session key. Further, other parties such as, for example, potential attackers, may, however, be prevented from generating the same session key because they do not have access to all of the same data. For example, the request 1018 does not include all of the values used in generating the session key.

The particular values used in generating the session key and how the computer server system has access to each will now be discussed. As discussed above, the computer server system 110 is the other party to the shared secret used by the electronic device 100 in generating the session key. Additionally, the computer server system 110 knows the fingerprint of the electronic device 100 as described above. The payment token is included in the request 1018. The payment token may be used as a key to lookup the secret value and/or the device fingerprint. For example, the mapping established between the payment account, the payment token, and the secret value established at the operation 750 (FIG. 7) may be referenced. Finally, if a transaction counter is used as an input to session key generation, then it may be independently maintained by the electronic device 100 and the issuer such as, for example, by the computer server system 110, being as the electronic device 100 and the issuer are involved in each transaction. For example, where EMV is employed both the issuer and the electronic device 100 may maintain an EMV Application Transaction Counter (ATC). Where a transaction counter is used in generating the session key, the computer server system 110 may retrieve, based on the payment token, the fingerprint, the secret value and the transaction counter from storage. For example, the computer server system 110 may include a storage module that may be used to retrieve and/or store data. In some embodiments, the storage module may retrieve and/or store data from/in storage that is secure against or resistant to attackers. For example, the computer system may utilize a trusted execution environment (TEE) of a processor of the computer server system 110. Additionally or alternatively. a security co-processor may be utilized Notably, the session key is generated according to the same key derivation/generation algorithm employed by the electronic device 100. As such, the session key generated by the computer server system 110 should be identical to the session key generated by the electronic device 100 such as at the operation 830 (FIG. 8) above.

Following generation of the session key, control flow proceeds to an operation 1230.

At the operation 1230, the cryptogram received in the request is verified using the session key generated at the operation 1220.

How the cryptogram is verified depends on the nature of the cryptogram. For example, the cryptogram may be verified according to one or more of the standards identified in the discussion of operation 1100 (FIG. 11) above.

If the cryptogram verification is successful (i.e. the cryptogram verifies ok), control flow proceeds to an operation 1230. Alternatively, if verification of the cryptogram fails, then control flow proceeds to an operation 1250.

At the operation 1240, the payment token is detokenized. The payment token may be detokenized by retrieving an account number associated with the payment token. For example, the mapping established between the payment account, the payment token, and the secret value established at the operation 750 (FIG. 7) may be referenced. Where the payment token is a PAN token, the result of detokenization may be a PAN.

Following detokenization, control flow proceeds to the operation 1250.

At the operation 1250 a reply is sent to the request 1018. The reply may include the status of the cryptogram verification (e.g., success/fail), the payment token, and/or the result of detokenizing the payment token (e.g., the account number). For example, it may be that in some embodiments, the reply includes an EMV cryptogram verification status, a PAN token, and a PAN, especially if the cryptogram verification was successful. An example of a reply is shown in FIG. 10 (for the case of successful cryptogram verification) as a message 1020.

Returning to FIG. 10, the message 1020 is sent by the computer server system to the payment network 920.

Responsive to the message 1020, the payment network may send an authorization message 1022 to the issuer authorization host computer system 930. The authorization message 1022 includes the result of the detokenization operation found in the message 1020. For example, the authorization message 1022 may include a PAN. In some embodiments, the authorization message may be an ISO 8583 authorization message.

Responsive to the authorization message 1022, the issuer authorization host computer system 930 sends an authorization response 1024 to the payment network 920. The authorization response 1024 may include a result authorizing or declining the transaction.

The payment network 920 then forwards the authorization response 1024 to the acquirer computer system 910 as an authorization response 1026. As illustrated, the authorization response 1026 serves as a reply to the message 1016.

The acquirer computer system 910 forwards the authorization response 1026 to the terminal 900 as an authorization response 1028. As illustrated, the authorization response 1026 serves as a reply to the message 1016.

As set out above, in some embodiments, messages may be according to ISO Standard No. 8583.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computer system comprising:
   a processor;
   a memory coupled to the processor, the memory storing instructions that, when executed by the processor, cause the computer system to:
   receive, from an electronic device over a secure channel, a provisioning request including a fingerprint of the electronic device and an account number;
   generate a secret value and a payment token associated with the account number;
   store, in a storage, the fingerprint, the secret value, and the payment token mapped to the account number;
   transmit to the electronic device, in response to the provisioning request, a provisioning reply that includes the payment token and the secret value;
   receive from the electronic device, via a network, a de-tokenization request, the de-tokenization request including the payment token and a cryptogram, the cryptogram having been generated by the electronic device using a first session key generated by the electronic device based on the fingerprint of the electronic device, a secret value previously shared with the electronic device, the payment token, and a transaction counter;
   retrieve, based on the payment token, the fingerprint, the secret value, and the transaction counter from the storage;
   in response to retrieving the payment token, the fingerprint, the secret value, and the transaction counter from the storage, generate a second session key based on the fingerprint, the secret value, the payment token, and the transaction counter;
   verify the cryptogram using the second session key;
   upon successfully verifying the cryptogram, retrieve the account number associated with the payment token from the storage; and
   send to the electronic device, via the network, a response to the de-tokenization request including the account number.

2. The computer system of claim 1 wherein the secret value includes a random number.

3. The computer system of claim 1 wherein the cryptogram was generated by the electronic device to perform a payment transaction and wherein the secret value was previously shared with the electronic device in preparation for performing that payment transaction.

4. The computer system of claim 1 wherein the first and the second session keys are generated by applying a cryptographic hash function one or more times using the fingerprint, the secret value, the payment token, and the transaction counter as inputs.

5. The computer system of claim 1 wherein the first and the second session keys are generated using one or more applications of a double-length key triple Data Encryption Standard cipher algorithm.

6. The computer system of claim 1 wherein the fingerprint is based on data in the memory of the electronic device.

7. The computer system of claim 1 wherein the electronic device is a smartphone and the fingerprint is based on at least one of an International Mobile Station Equipment Identity of the smartphone, an International Mobile Subscriber Identity of the smartphone, or an Integrated Circuit Card Identifier of a Subscriber Identity Module coupled to the smartphone.

8. A computer-implemented method comprising:
- receiving, from an electronic device over a secure channel, a provisioning request including a fingerprint of the electronic device and an account number;
- generating a secret value and a payment token associated with the account number;
- storing, in a storage, the fingerprint, the secret value, and the payment token mapped to the account number;
- transmitting to the electronic device, in response to the provisioning request, a provisioning reply that includes the payment token and the secret value;
- receiving, from the electronic device via a network, a de-tokenization request, the de-tokenization request including the payment token and a cryptogram, the cryptogram having been generated by the electronic device using a first session key generated by the electronic device based on the fingerprint of the electronic device, the secret value previously shared with the electronic device, the payment token, and a transaction counter;
- retrieving, based on the payment token, the fingerprint, the secret value, and the transaction counter from the storage;
- in response to retrieving the payment token, the fingerprint, the secret value, and the transaction counter from the storage, generate a second session key based on the fingerprint, the secret value, the payment token, and the transaction counter;
- verifying the cryptogram using the second session key;
- upon successfully verifying the cryptogram, retrieving the account number associated with the payment token from the storage; and
- sending, to the electronic device via the network, a response to the de-tokenization request including the account number.

9. The method of claim 8 wherein the secret value includes a random number.

10. The method of claim 8 wherein the cryptogram was generated by the electronic device to perform a payment transaction and wherein the secret value was previously shared with the electronic device in preparation for performing that payment transaction.

11. The method of claim 8 wherein the first and the second session keys are generated by applying a cryptographic hash function one or more times using the fingerprint, the secret value, the payment token, and the transaction counter as inputs.

12. The method of claim 8 wherein the first and the second session keys are generated using one or more applications of a double-length key triple Data Encryption Standard cipher algorithm.

13. The method of claim 8 wherein the fingerprint is based on at least one of data in a memory of the electronic device, an International Mobile Station Equipment Identity associated with the electronic device, an International Mobile Subscriber Identity associated with the electronic device, or an Integrated Circuit Card Identifier of a Subscriber Identity Module coupled to the electronic device.

* * * * *